UNITED STATES PATENT OFFICE.

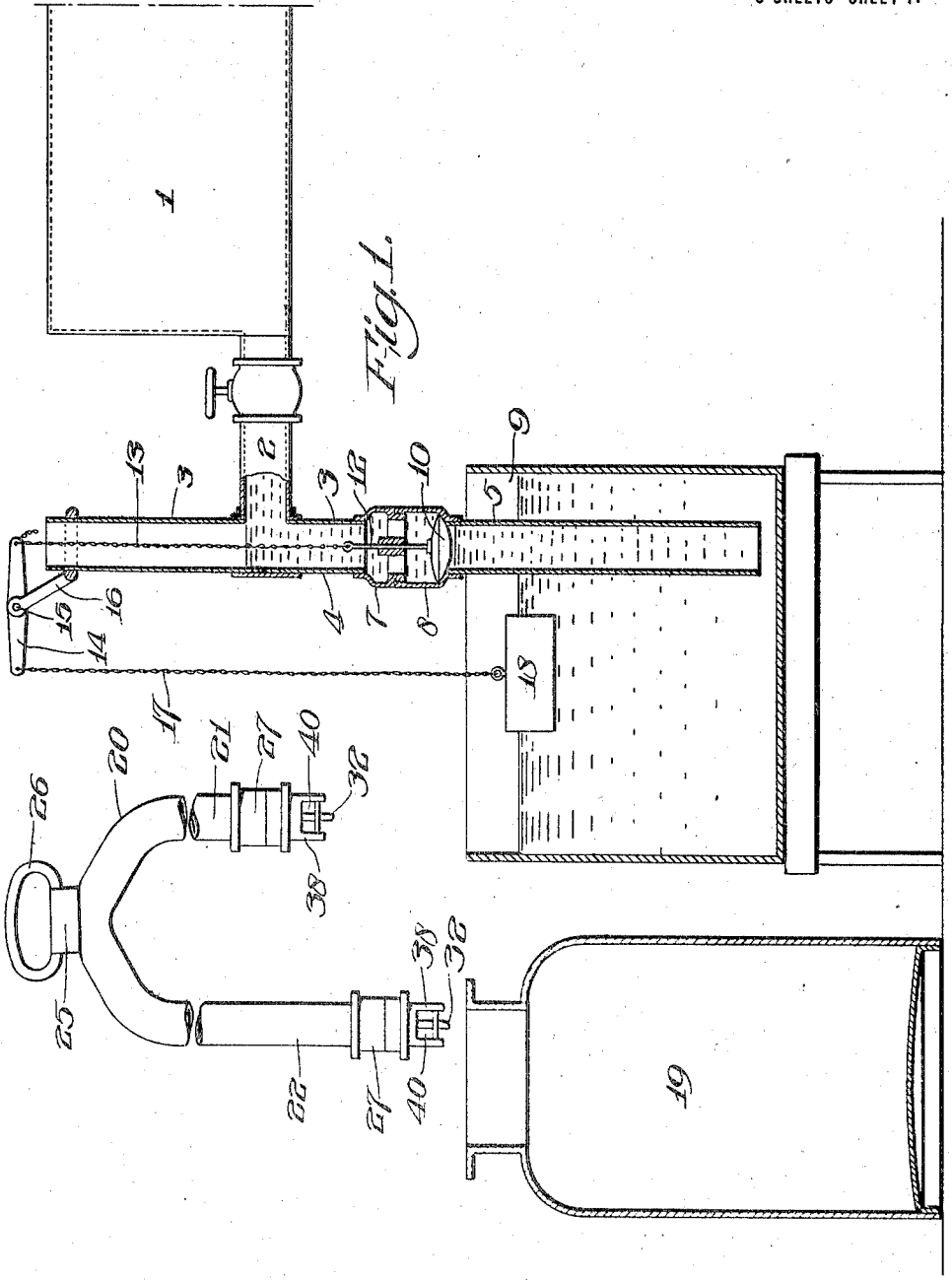

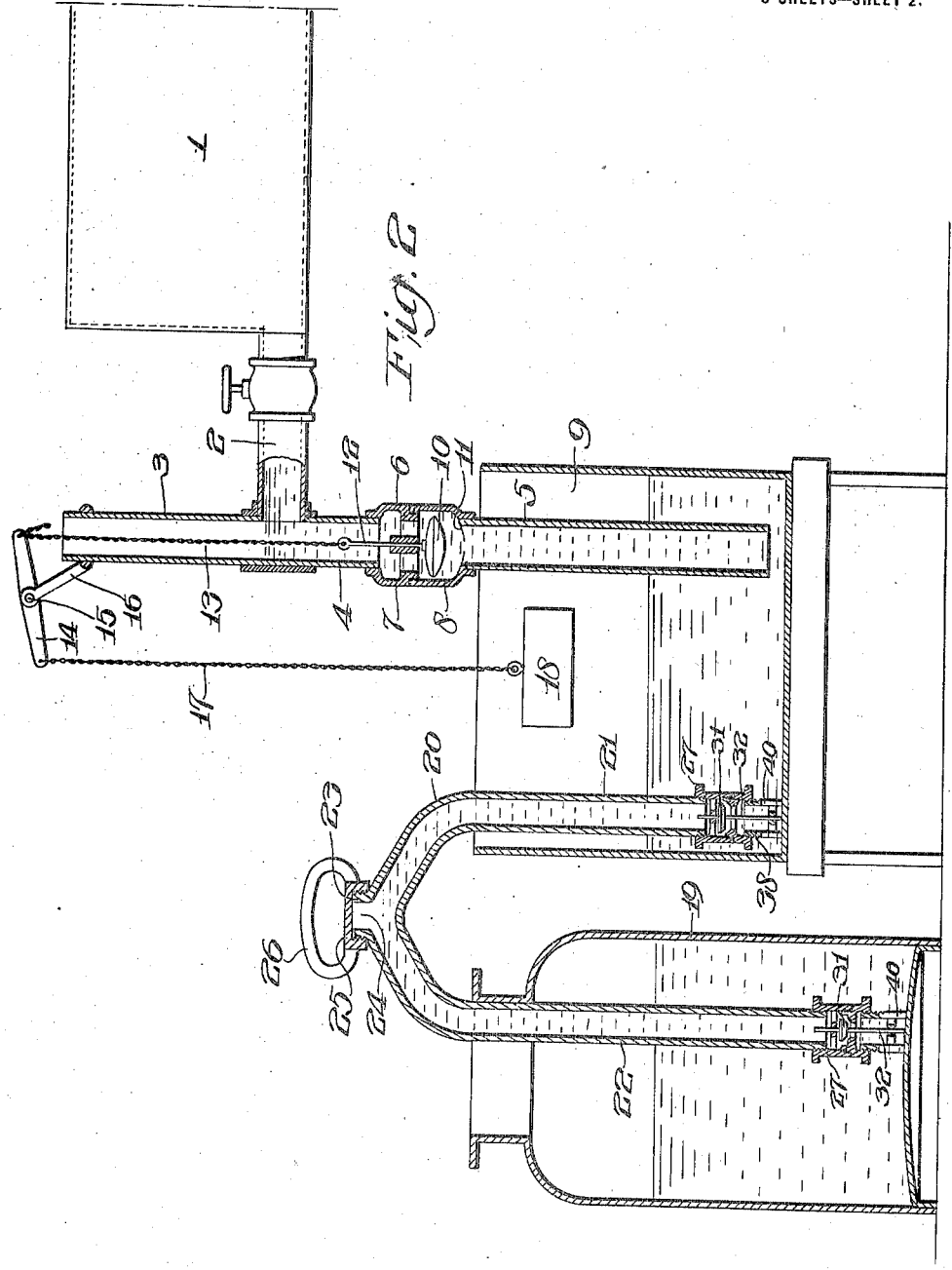

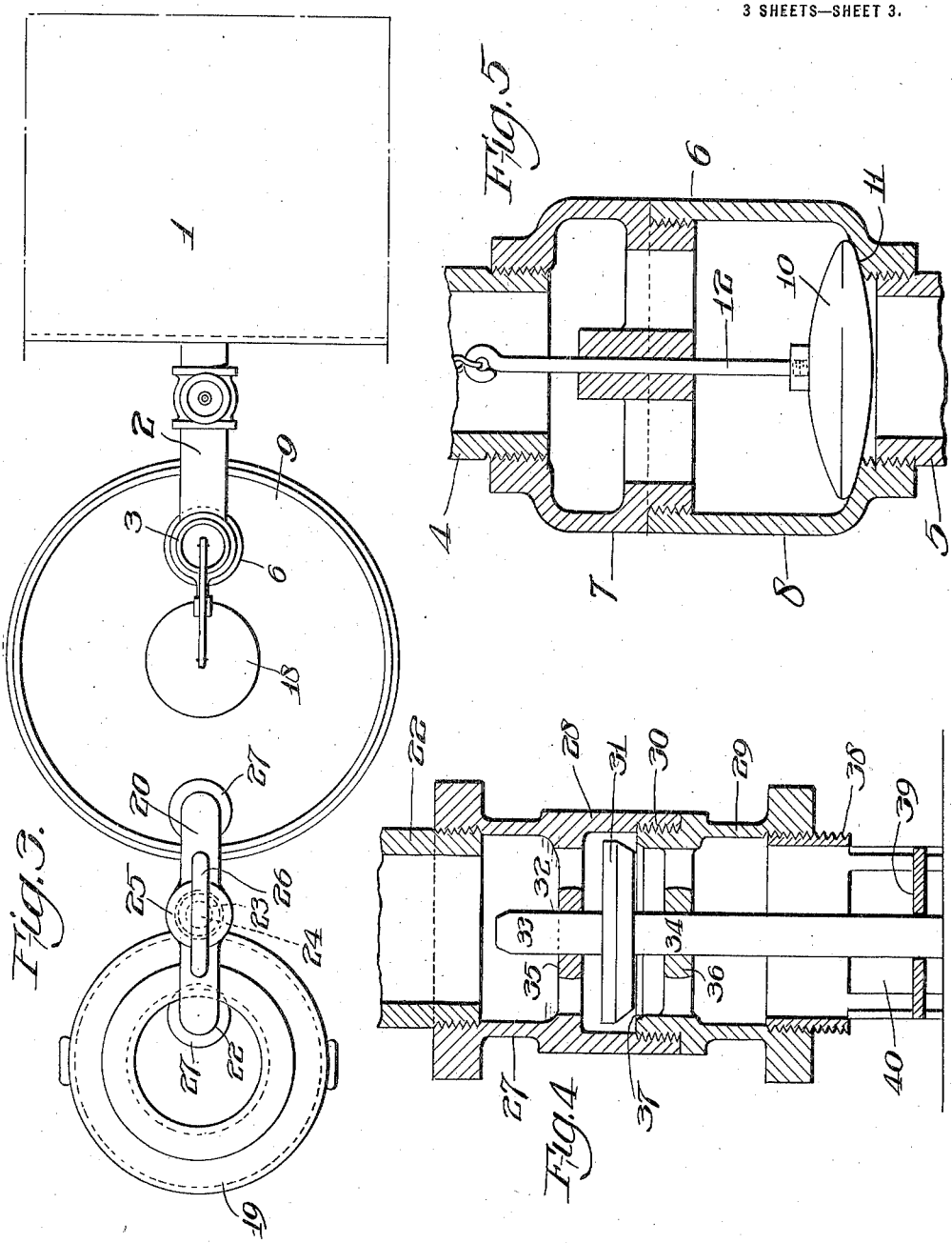

JOSEPH ROBERTS, OF PHILADELPHIA, PENNSYLVANIA.

APPARATUS FOR FILLING MILK-CANS.

1,290,358. Specification of Letters Patent. Patented Jan. 7, 1919.

Application filed March 30, 1918. Serial No. 225,640.

*To all whom it may concern:*

Be it known that I, JOSEPH ROBERTS, a citizen of the United States, residing at Philadelphia, in the county of Philadelphia and State of Pennsylvania, have invented certain new and useful Improvements in Apparatus for Filling Milk-Cans, of which the following is a specification.

It is well known that in creameries and dairies a large amount of milk is wasted when filling milk cans from vats, reservoirs, etc., due to the fact that milk, when running in the can, produces froth, and in order to properly fill the cans with milk, the froth is allowed to spill over the top of the cans. This froth alone contains a large quantity of milk and thus a large quantity of milk is wasted. Also, it is impossible to see when the cans are properly filled since the froth obscures the milk and very often the milk overflows and is thus wasted.

One object of my invention is to prevent the loss of milk while filling milk cans.

Another object of my invention is to provide means which will fill the cans to a predetermined level.

Another object is to so construct my invention as to prevent the formation of froth or foam in the cans while the latter are being filled with milk.

A still further object is to so make my invention that it can be easily manipulated and will be of comparatively simple construction.

Another object is to make my improved apparatus in such manner that it can be readily cleaned so as to be kept sanitary.

These objects, and other advantageous ends which will be described hereinafter, I attain in the following manner, reference being had to the accompanying drawings in which—

Figure 1 is a side elevation partly in section showing my apparatus in a position ready to fill a milk can.

Fig. 2 is a view of similar nature to Fig. 1 showing the apparatus in action filling the milk can, Fig. 3 is a top plan view of Fig. 2, Fig. 4 is an enlarged section showing the valve structure employed in a siphon which forms a part of my invention, and Fig. 5 is an enlarged fragmentary section showing a valve used for regulating the flow of milk into a main tank which forms a part of my invention.

Referring to the drawings, 1 represents a reservoir in which milk, after it is pasteurized or otherwise treated, is kept ready to be delivered to fill the milk cans. An outlet pipe 2 leads from the reservoir 1 and empties into a supply pipe 3. This supply pipe is made in two sections 4 and 5 having a valve casing 6 interposed between the sections. This valve casing in turn is made in two sections 7 and 8 which are screwed together so that they can be separated for cleaning purposes and to permit the removal of the pipe section 5 from the tank 9.

The pipe section 5 extends downwardly into the tank 9. The lower end of the pipe section 5 is open adjacent the bottom of the tank. A valve 10 is operative within the valve casing 6 and adapted by its own weight to engage a valve seat 11. The valve 10 has an upwardly projecting stem 12 which is secured to the lower end of a chain 13 which extends downwardly through the supply pipe section 4 and at its upper end this chain is connected to one end of a double-ended lever 14. The lever 14 is pivoted at 15 to a bracket 16 mounted on the upper end of the pipe section 4.

The other arm of the lever 14 has a chain 17 hung therefrom, the lower end of said chain having a float 18 secured thereto and positioned within the tank 9. The float 18 and chain 17 are of sufficient weight to normally hold the valve 10 in a raised position and off of its seat, such for example as shown in Fig. 2, to permit the milk to flow from the reservoir 1 through the supply pipe 3 into the tank 9. However, when the milk reaches a level in the tank 9 sufficiently high to engage and raise the float 18, the valve 10 will fall by gravity upon its seat 11 and thereby automatically cut off further flow of the milk into the tank 9, such position being shown in Fig. 1.

The milk can, as shown at 19, can be filled with milk up to the level of the milk within the tank 9 when the valve 10 is closed. In other words, there is a relation between the level of the milk in the tank 9 and the height to which the can is to be filled so that the cans can be filled to a predetermined level, thus insuring against the overflow of the milk as will be more clearly understood from the following description.

I provide a siphon 20 having two tubular leg portions 21 and 22. The leg portions 21 and 22, at their tops, are bent and communicate with each other, as clearly shown in Fig. 2. An exteriorly screw-threaded boss 23 is provided at the top of the siphon and has a passage 24 which is open at its top and communicates with the interior of the legs 21 and 22.

A cap 25 is adapted to be screwed on the boss 23 to close the passage 24 and the cap 25 is provided with a handle 26. By the use of this handle the cap can be screwed off or on the boss 23 and also the siphon can be lowered and raised so that the legs 21 and 22 can respectively enter the tank 9 and milk can 19 or be removed therefrom.

Each of the legs 21 and 22, adjacent its bottom, is provided with a valve structure; and since this valve structure is similar for each leg I will describe only one of the valve structures, for example, the one connected to the leg 22, and it will be noted that the valve structure connected to the leg 21 has similar elements which are similarly numbered in the drawing.

The bottom of the leg 22 has a valve casing 27 screwed thereon (see Figs. 1, 2, and 4). This valve casing, as illustrated, is made in two sections 28 and 29 which are screwed together at 30 so that they can be readily taken apart. A trap valve 31 is mounted within the casing and is secured to a stem 32, a portion 33 of which extends above the valve and a portion 34 of which extends below the valve.

The portion 33 is adapted to slide through a bearing 35 in the section 28 of the valve casing 27, and the portion 34 is adapted to slide through a bearing 36 in the section 29 of the valve casing 27.

The valve 31 is adapted to fall by gravity upon a seat 37 formed on the valve-casing section 29. A tubular standard or foot 38 is screwed in the bottom of the valve casing 27 and has a partition 39 forming a bearing and guide for the bottom portion of the stem 32, as clearly shown in Fig. 4. The foot 38 has annularly arranged openings 40 adjacent its extreme bottom, and the portion 34 of the stem 32 is of such length that when the foot 38 is resting on a base structure, such for example as the bottom of the milk can, the valve 31 will be raised from its seat 37. In other words, the bottom of the portion 34 of the valve stem will engage the base structure prior to the engagement therewith by the foot 38 and in so doing the valve seat will be moved downwardly from the valve and will permit milk to flow down through the leg 22 and out through the openings 40 into the milk can, in a manner which will be more fully described in the operation of the apparatus, it being noted that the valve stem within the leg 21 will be adapted to engage the bottom of the tank 9 in the same manner as described in connection with the valve stem in the valve casing of the leg 22, but instead of having the milk flow out of said openings as in the foot at the bottom of the leg 22, the milk will flow inwardly from the tank through these openings and down through the leg 22 into the milk can.

In the operation of my invention, the siphon 20, while in a suspended position, is initially primed with milk. This can be done by removing the cap 25 and pouring milk in through the passage 24, the valves 31 in the respective legs 21 and 22 being closed by gravity, due to their weight, upon the seats 37. After the siphon has been primed, as above noted, the cap 25 is again replaced and the leg 21 is inserted within the tank 9 and the leg 22 is inserted within the milk can 19.

When the valve stems in each of the legs 21 and 22 respectively engage the bottoms of the tank 9 and milk can 19, they are stopped in their downward movement and the legs 21 and 22 continue to move down until the feet 38 strike the bottoms of the tank 9 and can 19. Thus the valve seats 37 move downwardly from the valves 31, as above described, and the milk from the tank 9 will siphon into the can 19.

As the milk starts to run out of the tank 9 into the can 19, the float 18 being released from the buoyancy of the milk within the tank 9 will fall, due to its weight, and thereby open the valve 10 and admit milk into the tank 9 to again fill the tank 9 during which time the milk can 19 is being filled. The milk can will be filled up to a level equal to the highest level attained in the tank 9, and when the milk can is filled the tank 9 will also be refilled up to its highest level. The siphon 20 can then be removed from the tank 9 and milk can 19 and just as soon as the feet 38 are moved off of the bottoms of the tank 9 and can 19 the valves 31 will close by gravity and the siphon 20 will be filled with milk and will require no further initial priming, but on the contrary can be immediately used to fill another can from the tank 9.

By having the openings in the feet 38 adjacent the bottoms of the tank and can, the milk will flow from one to the other without producing froth since it will not fall through the air. Also, by having the supply pipe section 5 with its lower end in close proximity to the bottom of the tank 9, froth will be prevented from accumulating to any great extent in the tank 9. Thus the operator is able to fill the cans to the proper level without the device producing froth to any great extent in the cans.

The supply pipe and connecting parts can be cleaned, as above noted, and also the valve casings 27 can be taken apart and cleaned. Furthermore, the legs 21 and 22 can be cleaned by removing the cap 25 and inserting a swab or other means down through the passage 24 into the legs 21 and 22.

The apparatus can be conveniently handled and will operate automatically to insure the proper filling of the cans without waste of material.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. Filling apparatus of the character described including a tank, means for conducting liquid into said tank, means operative to cut off the flow of liquid into said tank when a predetermined level is reached, and a siphon having leg portions provided with valves which are opened due to respective contact with said tank and a receptacle which is to be filled, substantially as described.

2. Filling apparatus of the character described including a tank, means for conducting liquid into said tank, means operative to cut off the flow of liquid into said tank when a predetermined level is reached, a siphon having leg portions provided with valves which are opened due to respective contact with said tank and a receptacle which is to be filled, and feet located at the lower ends of said siphon legs and provided with openings to permit flow of the liquid from said tank through the legs of the siphon and into the receptacle to be filled, substantially as described.

3. Filling apparatus of the character described including a tank, means for conducting liquid into said tank, means operative to cut off the flow of liquid into said tank when a predetermined level is reached, and a siphon having leg portions provided with valves which are opened due to respective contact with said tank and a receptacle which is to be filled, said siphon having a passage communicating with the legs thereof independently of the valves permitting it to be primed with liquid when said valves are closed, substantially as described.

4. Filling apparatus of the character described including a tank, means for conducting liquid into said tank, means operative to cut off the flow of liquid into said tank when a predetermined level is reached, a siphon having leg portions provided with valves which are opened due to respective contact with said tank and a receptacle which is to be filled, said siphon having a passage communicating with the legs thereof independently of the valves permitting it to be primed with liquid when said valves are closed, and means for normally closing said passage, substantially as described.

5. Filling apparatus of the character described including a tank, means for conducting liquid into said tank, means operative to cut off the flow of liquid into said tank when a predetermined level is reached, a siphon having leg portions provided with valves which are opened due to respective contact with said tank and a receptacle which is to be filled, said siphon having a passage communicating with the legs thereof independently of the valves permitting it to be primed with liquid when said valves are closed, means for normally closing said passage, and a handle for raising and lowering said siphon, substantially as described.

6. Filling apparatus of the character described including a tank, a siphon having leg portions, and valves within said leg portions having stems adapted to respectively engage a portion of said tank and of the receptacle to be filled, whereby the valves are opened to siphon liquid from said tank into the receptacle, substantially as described.

7. Filling apparatus of the character described including a tank, a siphon having leg portions, valves within said leg portions having stems adapted to respectively engage a portion of said tank and of the receptacle to be filled, whereby the valves are opened to siphon liquid from said tank into the receptacle, and means for admitting priming material into said siphon, substantially as described.

In testimony whereof I have signed my name to this specification in the presence of two subscribing witnesses.

JOSEPH ROBERTS.

Witnesses:
 Mary A. Inglar,
 Chas. E. Potts.

Copies of this patent may be obtained for five cents each, by addressing the "Commissioner of Patents, Washington, D. C."